Figure 1:
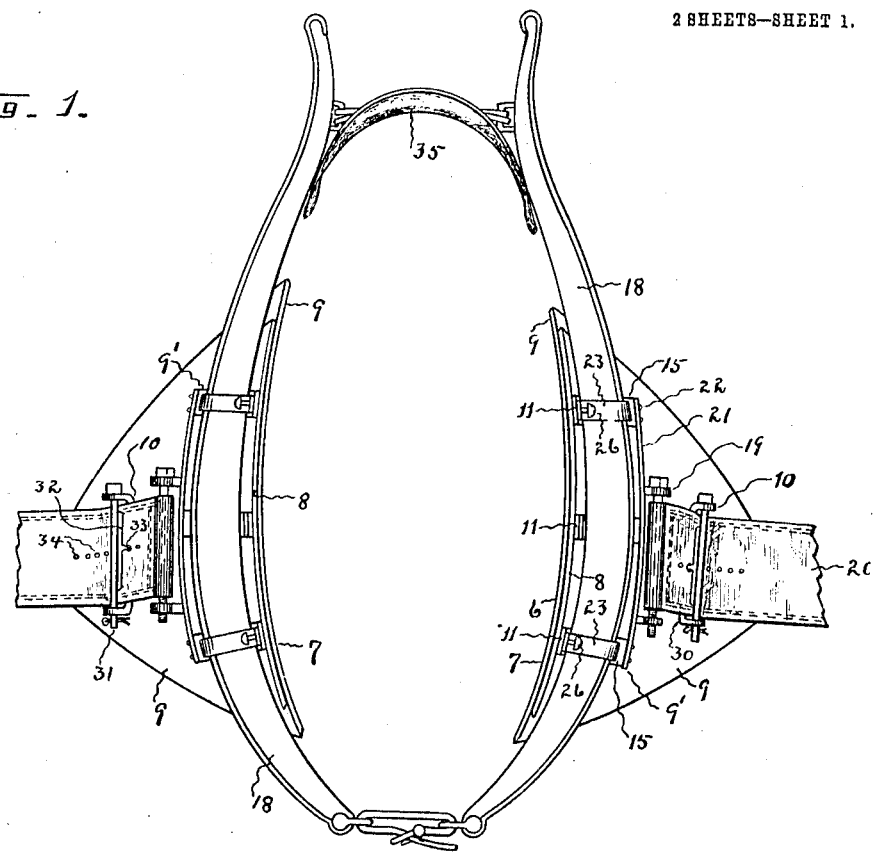

E. BROWN.
HORSE COLLAR.
APPLICATION FILED MAR. 8, 1910.

969,837.

Patented Sept. 13, 1910.
2 SHEETS—SHEET 1.

Witnesses
T. H. Broadwater
C. G. Somers

Inventor
Edward Brown,
By Hiram A. Sturges,
Attorney

E. BROWN.
HORSE COLLAR.
APPLICATION FILED MAR. 8, 1910.
969,837.
Patented Sept. 13, 1910
2 SHEETS—SHEET 2.
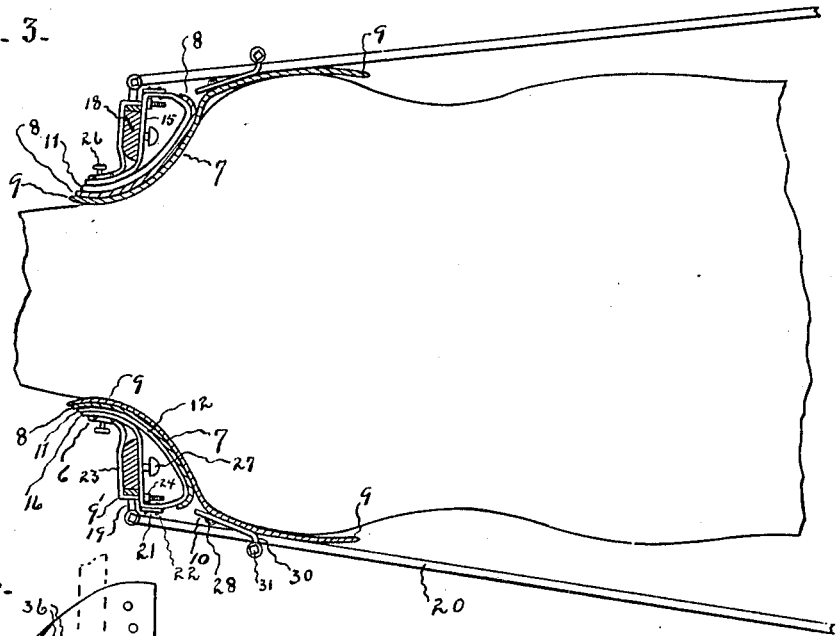
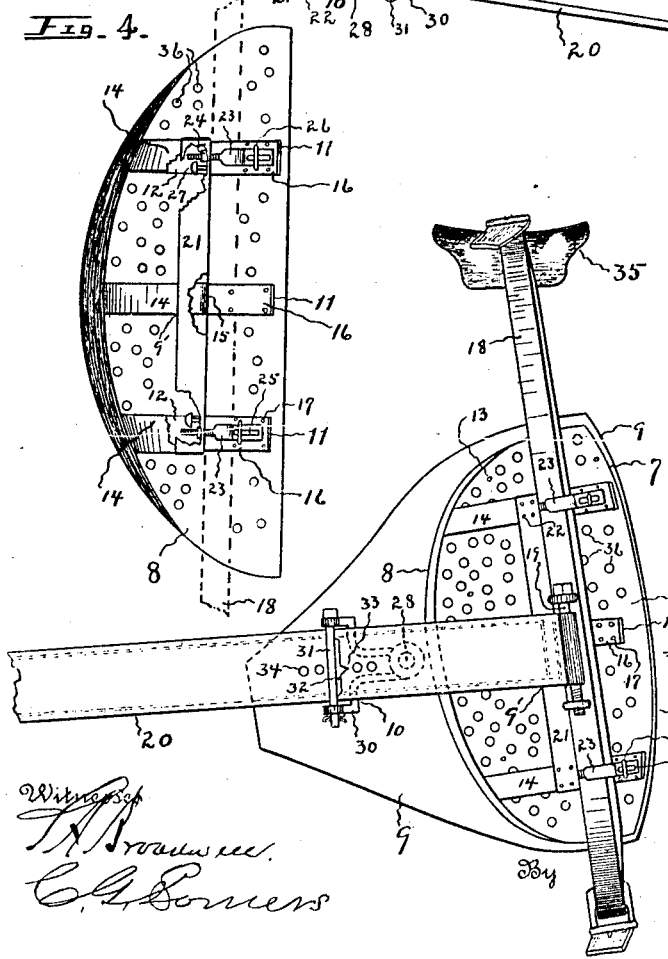
Inventor
Edward Brown,
Hiram A. Sturges
Attorney

UNITED STATES PATENT OFFICE.

EDWARD BROWN, OF OMAHA, NEBRASKA.

HORSE-COLLAR.

969,837.

Specification of Letters Patent. Patented Sept. 13, 1910.

Application filed March 8, 1910. Serial No. 548,104.

*To all whom it may concern:*

Be it known that I, EDWARD BROWN, a citizen of the United States, residing at Omaha, in the county of Douglas and State of Nebraska, have invented certain new and useful Improvements in Horse-Collars, of which the following is a specification.

This invention relates to improvements in horse collars, and has for its object, broadly, to provide collars of this class comprising parts which may be economically constructed, will be durable, and will be reliable in use for the support of the hames.

Another object is the provision of a horse collar which will consist of separate side-sections which may be secured intermediate the ends of the hames, thereby leaving the throat and neck of the animal practically bare or uncovered, the sections comprising the collar bearing upon the muscles adjacent the bones of the shoulder or clavicle, thereby not interfering with breathing and exciting less perspiration than where the neck is circumscribed by a collar.

Another object is the provision of means for making an adjustment of the hames, so that either the upper or lower ends thereof may be maintained at greater or lesser distances forwardly from the collar, this being desired so that the same collar may be used to advantage upon horses differing in shoulder development, also for use upon horses having gall sores or skin abrasions upon the neck or shoulders.

Another object is the provision of means for preventing the collar from "rolling" or swinging transversely. In ordinary constructions when the draft of the tugs is communicated to the hames, it causes the collar at the sides of the neck to partly turn or swing sidewise, thereby rubbing, or chafing the shoulders. By use of the present construction this objectionable result may be avoided.

Another object of the invention is to provide means for adjusting the draft or strain communicated to the outer and inner sides of the collar. In ordinary constructions the draft from the traces or tugs is communicated directly to the staples of the hames, these staples being disposed at the outer sides of the collar. In the present instance the draft is equalized or divided, the contact-plates sustaining, substantially, one half of the stresses or strains. It is important, however, to provide means for making an adjustment between the degree of draft upon the staples and contact-plates, for the reason that the anatomy and muscular development of draft animals are not uniform.

Another object is to provide a pivotal mounting for the tugs intermediate their ends, so that the rear ends of the tugs may be disposed at low or high altitudes incident to their use, without displacing the contact-plates.

The invention also includes a collar so constructed that hames of any ordinary style of manufacture and especially heavy hames may be employed and may be readily and conveniently mounted thereon, and also has reference to a metallic structure whereby the use of leather may be largely dispensed with.

With these and other objects in view, the invention consists of the novel construction, combination and arrangement of parts as described herein and claimed, and as illustrated in the drawing, it being understood that changes in form, size, proportion and minor details may be made within the scope of the claims, without departing from the spirit or sacrificing any of the advantages of the invention.

Figure 2:
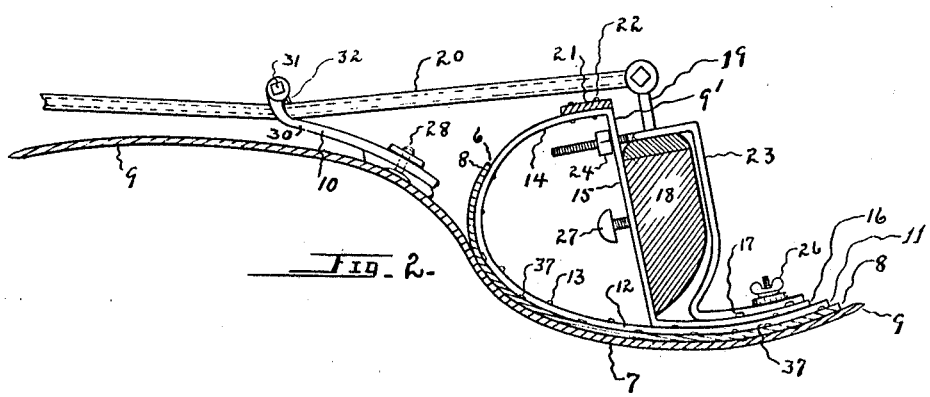

In the accompanying drawing Figure 1 is a vertical, front view of a pair of hames, a horse collar being connected therewith, and embodying my invention. Fig. 2 is a transverse sectional view of one of the collar-sections and a hame secured thereon. Fig. 3 is a diagrammatic view showing part of the body of a horse, the collar and hames being in section, and showing relative position of parts. Fig. 4 is a vertical, side view of a bearing plate, a part of a hame being added and indicated by broken lines, the supporting-frame being partly broken away to disclose certain parts. Fig. 5 is a side view of the collar to clearly illustrate the employment of certain devices for adjusting the hame with reference to the supporting frame.

Referring now to the drawing for a more particular description, numeral 6 indicates a horse collar comprising side sections 7, said sections being identical in structure and each consisting of a curved, metallic bearing-plate 8, a contact plate 9 preferably of leather, a supporting frame 9', and a pivotally mounted staple, connecting-member, holding-arm or rock plate 10. Plates 8 are rigid and each is curved transversely near its rear edges as plainly shown in Figs. 2 and 4, to provide a suitable bearing at the front of the shoulder of the horse; also each plate is formed with a longitudinal curvature (Fig. 1.) and its inner surface concaved, since its front edge projects somewhat forwardly of the shoulder and this shape conforms to the convexed surface of the side of the neck. Frame 9' may be any suitable structure to be rigidly secured upon the outer sides of bearing-plates 8 to provide a support for the hames; each supporting-frame herein shown comprises metallic bands or straps 11 each having a portion 12 curved longitudinally to conform to the outer surface of plate 8 and suitably secured to and transversely of the plate as by rivets 13, and having a portion 14 formed to extend forwardly of and to overhang portion 12, and provided with a sustaining arm 15 extending from portion 14 to portion 12 of the band and terminating in a portion 16 for a seating upon and near the terminal of the band or strap, to which it is secured, and in practice, rivets 17 may be employed to advantage, said rivets traversing portions 16, 11 and plates 8. As thus described the straps or bands provide irregularly shaped loops which may be readily mounted upon and may be rigidly secured upon plates 8, arms 15 being preferably disposed in alinement for the seating thereon of hames 18, staples 19 of the hames projecting outwardly of the sections, so that, when the parts are assembled, the sections will not be obtrusive to the movements of tugs or traces 20. The frame thus described provides a strong and comparatively light-weight structure and may be economically manufactured since no leather is employed and the parts required are few. At 21 is shown a longitudinal member or supporting-arm with which the several straps 11 may be rigidly connected as by use of rivets 22.

Near the ends of the frames are indicated clips 23 for rigidly securing the hames upon arms 15. These clips may be secured to the frames in any suitable manner. As herein shown one end of each clip is provided with a threaded terminal which traverses an arm 15, near its upper end, a screw-nut 24 being provided for said terminal, in and near the opposite end of the clip being formed a slot 25 traversed by a keeper 26 connected with portion 16 of the band or loop, and it will be seen that the clips may be employed to reliably secure a side section at any desired point intermediate the ends of the hames; also that hames differing in thickness may be conveniently secured to the collar.

At 27 are indicated set-screws, these having threaded connections with arms 15 at the ends of the frame, and by referring to Fig. 4 it will be seen that by use of these set screws, in connection with the adjustable features of clips 23, an adjustment may be made of the hames, or either of them, whereby the lower or upper ends of said hames may be disposed and maintained in positions forwardly of the frame, this being a desirable feature since the line of draft may thereby be conveniently changed to conform to the muscular development of the animal, and has been found to be of especial usefulness where a gall-sore appears upon the upper or lower part of the shoulder of an animal.

Disposed upon the inner sides of plates 8 and secured thereto in any suitable manner, as by rivets 37, are contact-plates 9, preferably of leather, and they each have an ample area, as shown in Figs. 3 and 5 so that no parts of plate 8 or the traces adjacent thereto can make contact with the draft animal, and since the contact-plates are of flexible material they readily conform to the curved parts of such portions of plates 8 as are necessary.

Pivotally mounted at 28 upon the outer sides of plates 9 are staples, rock-plates or connecting-members 10 which extend rearwardly, the rear end of said members being secured to traces 20. The particular construction of members 10 is not important so long as they have an adequate length and are provided with a pivotal mounting. By referring to Fig. 5 it will be seen that each staple consists of arms 30 disposed between a plate 9 and a trace, the terminals of the arms being curved outwardly and adapted to support eye-bolt 31 embracing the outer side of a tug. Since the eye-bolts are removable from the staples, the tugs may be conveniently placed within or removed therefrom; and by means of longitudinal blades or wedges 32 formed upon the eye-bolts, said wedges being provided with lugs 33, an adjustment may be made so that the lugs may engage within any one of openings or notches 34, formed at longitudinal intervals in the traces, and thereby the distance may be increased or decreased between the mountings, upon the tugs, of the connecting-members 10 and staples 19.

In operation, the draft of the tug is first imparted to wedge 32. Eye-bolts 31 and wedges 32 are of strong construction, and the strain causes reliable seatings of the wedges upon the tugs, said wedges being disposed between eye-bolts 31 and staples 19, the sides of the tugs being held between the wedges and the curved arms of members 10. It will be understood, of course, that the draft will be communicated from the tugs to staples 19 of the hames, but if arms or staples 10 form a connection between the traces and the flexible contact plates, a part of the draft, and substantially one-half thereof, will be sustained by said plates.

From the description it will be seen that an adjustment may be made of the parts just mentioned, so that the relative position of bearing-plates 8, with reference to the shoulders of the draft animal may be changed, as may be desired, this being in accordance with the shape of the shoulders and muscles. If, for instance, the mounting of the wedge of an eye-bolt 31, upon a trace, be changed to a point farther from staple 19, the side-section will swing, as is obvious, so that the rear part of plate 8 will move outwardly from the shoulder, the front part of said plate thereby being disposed inwardly toward the neck of the animal. By means of the parts mentioned a control is available for maintaining the side-sections at various angles to the line of draft, for the purposes named.

The adjustable features just described, together with means for causing an equality of draft to be maintained between the hames and flexible plates 9 are important, since they prevent the objectionable, horizontally-swinging movements of a collar. Such movements cause formation of abrasions or gall-sores upon the shoulder, from continued chafing.

Flexible contact-plates 9 should have a length sufficient to extend rearwardly of bearing-plates 8, and to provide a pivotal mounting for connecting-members 10, and to shield the skin of the draft animal from contact with these parts.

Since staples 10 may have swinging movements upon their pivotal mountings 28, displacement of the parts will not be occasioned when the rear ends of the tugs are mounted at different altitudes upon objects to be drawn; and the arms of staples 10 may have any suitable length.

In operation, the weight of the collar is sustained by the hames, the weight of the hames being sustained by neck-pad 35, the side-sections being disposed between the ends of the hames and leaving a considerable part of the neck and shoulders uncovered. At 36 are indicated perforations which may be formed in each bearing-plate 8, or such parts thereof as are seated upon the flexible contact-plates 9, the perforations tending to facilitate the removal of moisture from said leather plates.

Having fully described the several parts and their uses, any further description relating to operation is not necessary.

What I claim and desire to secure by Letters Patent is,—

1. A horse collar comprising a pair of longitudinal bearing-plates, flexible contact-plates disposed upon the inner sides of and secured to the bearing-plates; means upon the bearing-plates for securing upon their outer sides the front ends of the draft traces; and rearwardly-extending holding-arms having one of their ends pivotally mounted upon said flexible contact-plates, for a mounting of their opposite ends upon the draft traces.

2. A horse collar comprising rigid bearing-plates, said plates having their rear sides curved outwardly, their front sides being curved longitudinally and providing convexed outer surfaces; devices mounted upon the bearing-plates for securing upon their outer sides the front ends of the draft traces; and rearwardly extending holding-arms having their front ends connected with said rigid bearing-plates for a connection of their rear ends with the draft traces.

3. A collar of the class described consisting of a pair of side-sections each comprising a metallic plate, a leather contact-plate secured upon the inner side and extending rearwardly of the metallic plate, a metallic supporting-frame secured upon the front side of said metallic plate and providing a mounting upon the outer side of the metallic plate for the front end-portion of a draft-trace; and means for forming a pivotal connection, rearwardly of said metallic plates, between said leather contact-plates and the draft-traces, whereby a part of the draft from the traces may be communicated to said contact-plates.

4. A horse collar comprising side sections provided with longitudinal supporting-members, said longitudinal members being provided with transverse sustaining-arms; a plurality of clips mounted upon the transverse sustaining-arms for engagement with the hames, whereby the hames may be normally sustained parallel with the longitudinal supporting-members; adjusting devices upon said transverse sustaining arms for adjusting said hames transversely with reference to said longitudinal supporting-members.

5. A horse collar comprising separate, rigid, curved side-sections, each being provided upon its inner side with a flexible contact-plate; devices upon the side-sections for securing thereon the draft-traces; means for removably securing the sections upon the hames, the seating of said sections being at selected distances from the ends of the hames; means for maintaining the hames in inclined relation with reference to the sections; and a connection provided rearwardly of the side-sections, between the flexible contact-plates and the traces whereby a part of the draft from the traces may be sustained by said contact-plates.

In testimony whereof I have affixed my signature in presence of two witnesses.

EDWARD BROWN.

Witnesses:
 HIRAM A. STURGES,
 W. T. GRAHAM.